United States Patent Office 3,206,503
Patented Sept. 14, 1965

3,206,503
NORCAMPHORIC ACID MANUFACTURE
Nicholas P. Greco, Pittsburgh, Pa., assignor to Koppers Company, Inc., a corporation of Delaware
No Drawing. Filed June 13, 1962, Ser. No. 202,093
4 Claims. (Cl. 260—514)

This invention relates to the preparation of norcamphoric acid, cyclopentane-1,3-dicarboxylic acid, via the ozonation of norbornylene. In one specific aspect, it relates to a novel ozonation-oxidation method for converting norbornylene to a mixture of the cis- and trans-isomers of norcamphoric acid.

In recent years there has been considerable interest in the preparation of norcamphoric acid by ozonation. Robert H. Perry, in U.S. Patent 2,963,487, describes a process involving the ozonation of norbornylene in a non-participating solvent, such as ethyl acetate, at a temperature of about $-75°$ C. to $+25°$ C. to form a solid, solvent-insoluble polymeric ozonide which is oxidized with performic acid or molecular oxygen containing a catalytic amount of ozone to give the cis-isomer of norcamphoric acid, cis-cyclopentane-1,3-dicarboxylic acid. Although Perry's process represents an acceptable route for the preparation of norcamphoric acid, the solid polymeric ozonide thus obtained is often gelatinous in nature and large amounts of solvent occlude therein. The gelatinous mass is very difficult to filter and, although centrifugation accomplishes partial separation of the solid and the solvent, the solid must be completely dried for use in the oxidation step of the process. Perry in J. Org. Chem., 24, 829 (1959) discloses a different process involving the ozonation of norbornylene in methanol at $-70°$ C., and oxidation of the ozonation product with performic acid to give a product consisting essentially of cis-norcamphoric acid.

In the co-pending application of S. C. Temin et al., Ser. No. 90,642, filed February 21, 1961, there is disclosed and claimed an ozonation-oxidation method for converting norbornylene to a mixture of the cis- and trans-isomers of norcamphoric acid. According to this method, an aqueous medium capable of retaining norbornylene in suspension is provided. Norbornylene and ozone are added simultaneously thereto, preferably in stoichiometric quantities. The ozone and norbornylene are permitted to react at temperatures up to about $55°$ C. to form a water-soluble ozonation product. The aqueous solution containing the ozonation product is contacted with an oxidizing agent, i.e. air or molecular oxygen, at a moderately elevated temperature, and the product, a mixture of the cis- and trans-isomers of norcamphoric acid, is recovered from the reaction mixture by conventional techniques. The Temin et al. process, although providing for the first time a mixture of cis- and trans-norcamphoric acid, is unfortunately difficult to control. The norbornylene and ozone must be added to the aqueous medium simultaneously. Since the norbornylene is suspended rather than dissolved, large amounts of reactant are often swept out with the ozone carrier and the yields are thereby drastically reduced. The temperature used in the process is too high to avoid entirely physical losses of norbornylene by vaporization.

I have discovered a novel process which unexpectedly eliminates the disadvantages attendant both the Perry and Temin et al. processes and surprisingly provides a mixture of the cis- and trans-isomers of norcamphoric acid, the weight ratio of the cis- to trans-acid being about 4–9:1. The presence of appreciable portions of the trans-acid gives a useful product having a lower melting point than the pure cis-isomer. Surprisingly, my new process provides, under preferred conditions, a mixture containing an even greater precentage of trans-acid than that obtainable using the process of Temin et al.

The lower melting point of the isomeric mixture is particularly significant when norcamphoric acid is converted to its useful derivatives, e.g. the simple diesters described in the co-pending application of S. C. Temin, Serial No. 34,649, filed June 8, 1960, now U.S. Patent 3,041,369, and the polyesters made by the reaction of norcamphoric acid with an alkylene glycol, described in the co-pending application of S. C. Temin, Serial No. 56,035, filed September 19, 1960, now U.S. Patent 3,041,314. The diesters and polyesters of norcamphoric acid are remarkably effective as plasticizers when admixed with thermoplastic resins, such as polyvinyl chloride, chlorinated polyethylene, polyvinyl butyral, polyvinyl acetate, polystyrene, styrene-butadiene copolymers, styrene-acrylonitrile copolymers, vinylidene chloride-acrylonitrile copolymers, and the like, in an amount ranging between 10–120% by weight, based on the weight of the resin.

It is, therefore, an object of the present invention to provide a new method for making norcamphoric acid from norbornylene by an ozonation-oxidation technique. It is a further object to provide a method that eliminates the operating difficulties attendant prior methods and gives as a product a mixture of the cis- and trans-isomers of norcamphoric acid, the trans-isomer often being present in an amount greater than that heretofore obtainable.

In accordance with the invention, norbornylene is dissolved in a non-participating inert organic solvent having a freezing point lower than the temperature at which the reaction is to be conducted and containing water in an amount of at least one mole of water per mole of norbornylene. Ozone is reacted with the dissolved norbornylene at a temperature ranging between $-75°$ to $-20°$ C. to form a water-soluble ozonation product. The reaction mixture is then allowed to age until the active oxygen content of the ozonation product remains substantially constant. The ozonation product is then contacted with oxygen under a positive pressure of up to 200 p.s.i.g. at a temperature of up to $110°$ C. to form norcamphoric acid, which is recovered from the reaction mixture by conventional techniques, such as evaporation, recrystallization or distillation.

An important feature of my invention is the medium which is provided for the reaction between norbornylene and ozone. The Criegee mechanism of ozonation has now attained general acceptance, and according to it, ozonation solvents fall into one of two classes: (1) participating solvents which react with the so-called "zwitter" ion to form peroxidic products, and (2) non-participating solvents with which the "zwitter" ion does not react and therefore reacts with itself to form true ozonides or polyperoxides. The use of non-participating solvents for the ozonation of norbornylene and the resulting formation of a polymeric ozonide is described in U.S. Patent 2,963,487, issued to Robert H. Perry. I have now found that the most suitable reaction medium for the ozonation of norbornylene is a mixture of water and a substantial portion, i.e. greater than 45% by volume up to about 95% by volume, of a non-participating inert organic solvent.

It is necessary for purposes of the invention that the water be present in the solvent medium in an amount at least equal to one mole of water per mole of norbornylene in order to avoid the formation of the polymeric ozonide. Sufficient non-participating organic solvent must be present to completely dissolve the norbornylene. If the norbornylene is not completely dissolved, relatively large amounts are lost due to sweep-out by carrier gas for the ozone. Generally speaking, the volume ratio of non-participating solvent to water should range between 75–95:5–25.

The non-participating inert organic solvent used in the reaction medium must be one with a freezing point lower than the contemplated reaction temperature, i.e. lower than about −75° C. to −20° C., and one which is miscible with water at these temperatures. The low freezing point of the solvent-water mixture permits the use of temperatures at which the undesirable escape of norbornylene, because of its high vapor pressure, is eliminated. Useful non-participating solvents include acetone, tetrahydrofuran, 1,3-dioxane, methyl ethyl ketone, methyl isobutyl ketone, diisopropyl ketone, and the like. Of these, acetone is the preferred non-participating solvent.

The norbornylene is conveniently dissolved in the water-non-participating solvent medium in an amount ranging between 5 and 30% by weight. The dissolved norbornylene is thereafter intimately contacted with ozone in an amount equal to about a stoichiometric quantity of ozone, based upon the amount of norbornylene (a 1:1 mole ratio). Mole ratios of higher than 1:1 can be used, but a large excess of ozone, viz: greater than about 2:1, is undesirable because of the danger of forming explosive mixtures of gases in the equipment. An ozone to norbornylene mole ratio of 1.1–1.2:1 is preferred. It is desirable to add the ozone at a rate not greater than the rate of the ozone absorption by the reaction mixture.

An oxygen-containing gas is used as a carrier for the ozone during the reaction. The type of gaseous carrier and the concentration of ozone therein depends upon the type of equipment used. Certain generators provide a stream of ozone in air in concentrations of up to about 5% by volume. Others provide ozone in oxygen, the concentration of ozone ranging up to about 8% by volume.

The reaction between ozone and norbornylene is relatively rapid. The reaction time will, therefore, depend upon the starting quantity of norbornylene and the intimacy of contact between the ozone and norbornylene.

The reaction is preferably conducted at atmospheric pressure, although higher pressures up to several atmospheres can be used to prevent the escape of the highly volatile norbornylene.

The reaction temperature ranges between about −75 to about −20° C., preferably between −40 to −30° C. The use of higher temperatures is undesirable because of the volatility of the norbornylene at atmospheric pressure. Lower temperatures are more costly to maintain because the peroxidic ozonation product undergoes a physical change at such temperatures.

The peroxidic ozonation product obtained in the process of the invention is soluble in the water-non-participating solvent mixture and contains a much higher active oxygen content than that of the polymeric ozonide. The ozonation product obtained initially upon completion of the reaction, which has an active oxygen content even higher than the theoretical, is somewhat unstable. The immediate oxidation of this ozonation product produces a difficultly controllable exothermic reaction and results in considerable loss of product. It is, therefore, necessary to allow the ozonized reaction mixture to stand until the active oxygen content of the peroxidic product falls to a constant level (i.e. from about 110% to about 80% of theory, calculated on the basis of two equivalents of active oxygen per mole of norbornylene). This decrease in active oxygen, which generally takes place in 16–24 hours, results in an ozonation product which is easily oxidized to the desired norcamphoric acid.

After the ageing period, the ozonation product is non-catalytically oxidized under moderate oxygen pressure to form the desired mixed stereoisomers of norcamphoric acid. Oxidation is accomplished using a temperature of about 25–110° C. and a pressure of up to 200 p.s.i.g.; preferably a temperature of 50–110° C. and a pressure of about 100 p.s.i.g. Because of the hazards of the presence of acetone vapor and oxygen, the pressures and temperatures are kept as low as is practical.

The time required for the oxidation of the ozonation product varies with the temperature and pressure of oxidation and the concentration of the starting ozonation product, although conversion is generally complete in a period of ten to forty minutes. After oxidation is complete, the product norcamphoric acid is conveniently recovered by conventional means.

The crude reaction product thus obtained represents a yield of 65–85%, based upon the norbornylene charged. The product is a mixture of the cis- and trans-isomers of norcamphoric acid, the amount of cis- to trans- being approximately 4–9 parts cis- for each part of the trans-isomer.

A convenient method for the purification of the crude acid mixture is to esterify the mixture and distill the ester. Esterification can be done with various low boiling alcohols, although the use of n-butyl alcohol is preferred. The di-n-butyl esters of the mixed 1,3-cyclopentane dicarboxylic acids are readily distillage and are more stable to hydrolysis than the low boiling methyl esters.

If 1,3-cyclopentane dicarboxylic acid rather than one of its esters is desired, the aqueous concentrate obtained after organic solvent removal is further distilled at 40–60 mm. of Hg to remove water and low boiling acidic by-products. When the residue is essentially dry, water is added to dissolve the residue. This is readily accomplished at moderately elevated temperatures, e.g. 50° C. The aqueous solution is removed from the still, cooled to room temperature and 1,3-cyclopentane dicarboxylic acid is filtered off. At this point the mother liquor contains most of the more soluble trans-acid. The product can be recovered from the mother liquor by evaporation to dryness or esterification.

The crude acid can be recrystallized from water. The melting point of the product will vary, depending on the amount of trans-isomer which is present. Cis-trans-isomer ratios in the range of 80:20 to 90:10 are usually obtained. The pure cis-isomer melts at 121° C. and the pure trans-isomer melts at 89° C.

My invention is further illustrated by the following examples:

Example I

Norbornylene (47 grams, 0.5 mole) was dissolved in acetone (735 ml.) containing water (80 ml.) and was charged to a three-liter resin pot equipped with a Teflon stirrer, fitted gas inlet, and thermometer. An ozone-oxygen stream containing 4 mole percent ozone was bubbled through this homogeneous solution maintained at −35° C. until one-half mole of ozone had been added.

The reaction mixture was allowed to stand at room temperature for 24 hours. Oxidation and rearrangement occurred, with the formation of some 1,3-cyclopentane dicarboxylic acid.

The water white solution from the ozonation reactor was charged to a one-gallon, stirring (314 stainless steel) autoclave and pressured with oxygen to 100 p.s.i.g. Oxygen was absorbed and the temperature rose to 110° C., at which point the absorption of oxygen had ceased. The total oxygen pressure drop was 15 to 20 p.s.i.g. The reaction time was 20 minutes, including heat-up time. The autoclave contents were cooled to room temperature and discharged into a suitable distillation pot.

The acetone solution (water white) from the autoclave was distilled at atmospheric pressure to recover the acetone. To the aqueous, concentrated solution of 1,3-cyclopentane dicarboxylic acids remaining there was added an excess of n-butyl alcohol (300 ml.) and toluene (200 ml.) containing catalytic amounts of sulfuric acid (0.5 ml.). The mixture was stirred and refluxed under a Stark and Dean trap until water no longer appeared in the azeotrope. The residual solution, after being cooled to room temperature, was agitated with sodium bicarbonate (5% aq. soln.) until neutral. The bottom aqueous layer was discharged. The remaining organic layer was washed with water (500 ml.) and the water discarded. The organic layer was dried by azeotroping again in the esterification vessel and strip distilled at 50° C. and 100 mm. of Hg to recover toluene and unreacted butyl alcohol. The residue was distilled at reduced pressure. The di-n-butyl 1,3-cyclopentane dicarboxylate fraction boiled at 160–163° C. (6 mm. of Hg) and was collected (97 grams) in 72% yield; sapon. equiv.: calc'd, 135; found 134.

There were also 10.5 grams of a lower boiling fraction (50–155° C. at 6 mm. of Hg) and 11 grams of a fraction boiling higher than 163° C. at 6 mm. of Hg.

The free acids obtaiend by saponification were analyzed and found to contain the cis- and trans-isomers of 1,3-cyclopentane dicarboxylic acid in the ratio of 84 cis: 16 trans. If the reaction is run substituting tetrahydrofuran, 1,3-dioxane, methyl ethyl ketone, methyl isobutyl ketone or diisopropyl ketone for the acetone used as the non-participating solvent, similar results are obtained.

Example II

A three-neck, three-liter, resin flask was charged with norbornylene (47 grams, 0.5 mole), acetone (735 ml.), and water (80 ml.). The solution was cooled in an acetone-Dry Ice bath to −65° C. and ozonized with a 2% ozone in oxygen gas stream at a feed rate of 0.00198 m. ozone/min. until 0.5 mole of ozone had been added. The peroxidic product assayed for 0.98 equivalent of active oxygen. After standing overnight the active oxygen decreased to 0.94 equivalent. The peroxidic solution was then charged to a one-gallon, stirring autoclave at 30° C. under 150 p.s.i.g. of oxygen pressure and heated to 60° C. The pressure dropped from 170 p.s.i.g. to 140 p.s.i.g. in eight minutes with a marked evolution of heat. The temperature was maintained at 60° C. with cooling until the oxygen absorption ceased. The final pressure in the autoclave at 30° C. was 120 p.s.i.g., which was equivalent to 30 p.s.i.g. absorption of oxygen (ca. 0.25 mole of oxygen). The clear, water white solution was distilled to remove acetone and crystals of 1,3-cyclopentane dicarboxylic acid formed when the residual aqueous solution was allowed to cool to room temperature.

The crude acid was esterified with n-butyl alcohol to give 130 grams of crude esters. Fractional distillation of these crude esters gave 90 grams of the di-n-butyl ester of 1,3-cyclopentane dicarboxylic acid, B.P. 158–165° C. at 6 mm. of Hg: $n_D^{28}$ 1.4471; sap. eq., 135 (theory 135), representing a 70% yield of acid. There were also obtained 20 grams of a lower boiling fraction (110–158° C. at 6 mm. of Hg) and 20 grams of a fraction boiling higher than 165° C. at 6 mm. of Hg.

Example III

A solution of norbornylene (47 grams, 0.5 mole) in 900 ml. of C.P. acetone was ozonized at −65° C., in three hours and 57 minutes with an ozone in oxygen gas stream at a feed rate of 0.0021 m. ozone/min. The active oxygen in the ozonate was 0.735 eq. and, after standing overnight, it remained unchanged. The clear solution was charged to a one-gallon stirring autoclave and oxidized at 80° C. under 60 p.s.i.g. of oxygen with a marked evolution of heat. The temperature was maintained at 80° C., with cooling, until no more absorption occurred. The pressure dropped to 43 p.s.i.g. after eight minutes. The autoclave was heated to 110° C. and more oxygen added until the pressure reached 80 p.s.i.g. No further absorption of oxygen occurred at this higher temperature. After removing the acetone by distillation, a residue of light colored oil was obtained which failed to crystallize. This oil was esterified with n-butyl alcohol to give 118 grams of crude esters. Fractional distillation of the crude esters gave 42 grams (31% yield) of the di-n-butyl ester of 1,3-cyclopentane dicarboxylic acid, B.P. 160–165° C. at 6 mm. of Hg; 45 grams of a lower boiling product, B.P. 120–160° C. at 6 mm. of Hg; and 32 grams of a residue boiling above 165° C. at 6 mm. of Hg.

It is thus seen that the ozonation of norbornylene in acetone, and, in the absence of water, gives a drastically reduced yield of product.

Example IV

Norbornylene (47 grams, 0.5 mole) was dissolved in acetone (735 ml.) and after the addition of water (80 ml.) the solution was cooled to −35° C. The homogeneous solution was ozonized at the rate of 0.0021 m. ozone/min. until 0.55 mole of ozone had passed into the reactor. The solution was then air blown for eight minutes to remove dissolved ozone. Analysis for active oxygen indicated a total of 1.297 eq. and for acidity 0.429 eq. The peroxidic material was immediately oxidized, being kept cool at Dry Ice temperatures while charging to a pressure vessel at room temperature. Oxygen was added until the pressure reached 200 p.s.i.g. and the autoclave was heated to approximately 110° C. A marked exotherm occurred and considerable cooling was necessary to keep the temperature from rising. Oxidation was continued until no further oxygen was absorbed. The oxidized product was finally distilled to remove acetone and water. The residue was a light colored solid which was esterified with n-butyl alcohol. Fractional distillation of the esters gave 63 grams (47% yield) of the di-n-butyl ester of 1,3-cyclopentane dicarboxylic acid, B.P. 158–163° C. at 6 mm. of Hg; 27 grams of a lower boiling product, B.P. 90–158° C. at 6 mm. of Hg; and 17 grams of a residue boiling above 163° C. at 6 mm. of Hg. The 63 gram yield of the desired di-n-butyl ester of 1,3-cyclopentane dicarboxylic acid was much lower than when the peroxidic ozonation product was aged for a period of 16–24 hours at room temperature.

It is seen that the omission of the critical ageing period of the peroxidic ozonation product gives a considerably reduced yield of the desired mixture of norcamphoric acids.

I claim:

1. Method of making norcamphoric acid comprising dissolving norbornylene in a water-miscible, non-participating organic solvent selected from the group consisting of acetone, tetrahydrofuran, dioxane, methylethyl ketone, methylisobutyl ketone, and diisopropyl ketone and containing water in an amount of at least one mole of water per mole of norbornylene, reacting said norbornylene with ozone at a temperature ranging between −75° C. to −20° C. to form a water-soluble ozonation product, allowing the reaction mixture to age until the active oxygen content of said ozonation product remains substantially constant, contacting said ozonation product with oxygen under a positive pressure of up to 200 p.s.i.g. at a temperature of up to 110° C. to form norcamphoric acid and recovering said norcamphoric acid from the reaction mixture.

2. Method of making norcamphoric acid comprising dissolving norbornylene in acetone containing water in an amount of at least one mole of water per mole of norbornylene, reacting said norbornylene with ozone at a temperature ranging between −75° C. to −20° C. to form a water-soluble ozonation product, allowing the reaction mixture to age until the active oxygen content of said ozonation product remains substantially constant, contacting said ozonation product with oxygen under a positive pressure of up to 200 p.s.i.g. at a temperature of up to 110° C. to form norcamphoric acid and recovering said norcamphoric acid from the reaction mixture.

3. Method of making norcamphoric acid comprising dissolving norbornylene in acetone containing water, the volume ratio of acetone to water being 75–95:25–5, reacting said norbornylene with ozone at a temperature ranging between −40° C. to −30° C. to form a water-soluble ozonation product, allowing the reaction mixture to age until the active oxygen content of said ozonation product remains substantially constant, contacting said ozonation product with oxygen under a positive pressure of 15 to 200 p.s.i.g. at a temperature of 25 to 110° C. to form norcamphoric acid and recovering said norcamphoric acid from the reaction mixture.

4. Method of making norcamphoric acid comprising dissolving norbornylene in acetone containing water, the volume ratio of acetone to water being 75–95:25–5, reacting said norbornylene with ozone at a temperature ranging between −40° C. to −30° C. to form a water-soluble ozonation product, allowing the reaction mixture to age for 16–24 hours, contacting said ozonation product with oxygen under a positive pressure of 15 to 200 p.s.i.g. at a temperature of 25 to 110° C. to form norcamphoric acid and recovering said norcamphoric acid from the reaction mixture.

References Cited by the Examiner
UNITED STATES PATENTS

| | | | |
|---|---|---|---|
| 2,963,487 | 12/60 | Perry | 260—514 X |
| 2,969,376 | 1/61 | Perry | 260—514 X |

FOREIGN PATENTS 741,739  12/55  Great Britain.

OTHER REFERENCES

Perry: J. Org. Chem. (London), vol. 24 (1959), pages 829–833.

LORRAINE A. WEINBERGER, *Primary Examiner.*
LEON ZITVER, *Examiner.*